(12) United States Patent
Palese

(10) Patent No.: US 6,768,873 B1
(45) Date of Patent: *Jul. 27, 2004

(54) OPTICAL COMMUNICATION SYSTEM USING OPTICAL TRANSCRIPTION MATERIAL

(75) Inventor: Stephen P. Palese, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 579 days.

This patent is subject to a terminal disclaimer.

(21) Appl. No.: 09/586,513

(22) Filed: Jun. 2, 2000

(51) Int. Cl.[7] .......................... H04J 14/02; H04B 10/00
(52) U.S. Cl. .......................... 398/140; 398/91; 398/170
(58) Field of Search ............................... 359/110, 111, 359/117, 129, 130, 131, 133, 134, 154, 160, 161, 169, 170, 188, 195, 152; 250/201.9, 550, 494.1, 503.1, 227.17; 356/121; 398/39, 55, 86–88, 91–92, 140, 157–158, 169–170, 200, 214, 135

(56) References Cited

U.S. PATENT DOCUMENTS

| | | | |
|---|---|---|---|
| 4,141,652 A | * | 2/1979 | Feinleib ...................... 356/121 |
| 4,490,039 A | * | 12/1984 | Bruckler et al. ............. 356/121 |
| 4,943,709 A | * | 7/1990 | Grinberg et al. .......... 250/201.9 |
| 5,015,054 A | * | 5/1991 | Chaffee ........................ 385/27 |
| 5,239,548 A | | 8/1993 | Babbitt et al. ................ 372/26 |
| 5,377,284 A | | 12/1994 | Bülow .......................... 385/11 |
| 5,381,257 A | * | 1/1995 | Ferrar ........................ 359/156 |
| 5,389,782 A | * | 2/1995 | Hilliard ................. 250/227.17 |
| 5,475,518 A | | 12/1995 | Karaki ....................... 359/154 |
| 5,710,652 A | * | 1/1998 | Bloom et al. ............... 398/129 |
| 5,952,818 A | * | 9/1999 | Zhang et al. ................. 324/96 |
| 6,078,417 A | * | 6/2000 | Perino et al. ............... 398/157 |
| 6,501,578 B1 | * | 12/2002 | Bernstein et al. ........... 398/201 |
| 6,516,103 B1 | * | 2/2003 | Palese ............................ 385/5 |

* cited by examiner

Primary Examiner—Leslie Pascal
Assistant Examiner—Dalzid Singh

(57) ABSTRACT

An optical communication system for communicating through a turbulent medium is disclosed. It includes an optical transmitter and an optical receiver. The optical receiver receives an optical signal containing information that fluctuates as it passes through a turbulent medium. It comprises a reflector for collecting the optical signal and for focusing it, a probe laser for generating an optical probe beam, an optical device having an OTM responsive to the focused optical signal and the probe beam and operative to change a characteristic of the probe beam, and optoelectronic detector means responsive to the changed characteristic and, operative to develop an output electrical signal representative of the information contained in the received optical signal.

14 Claims, 12 Drawing Sheets

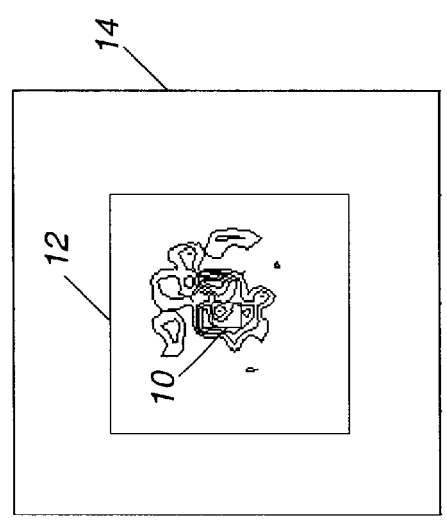
Fig. 1A Signal beam at time t1
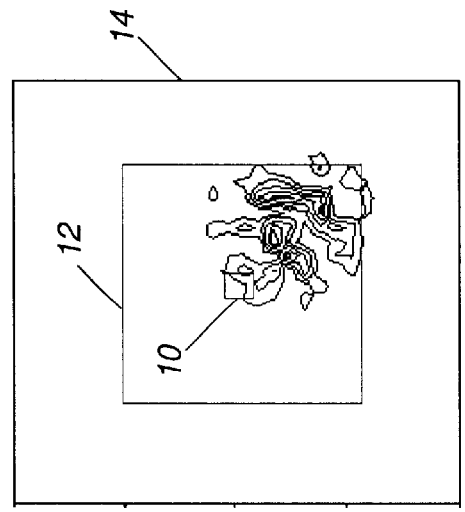
Fig. 1B Signal beam at time t2
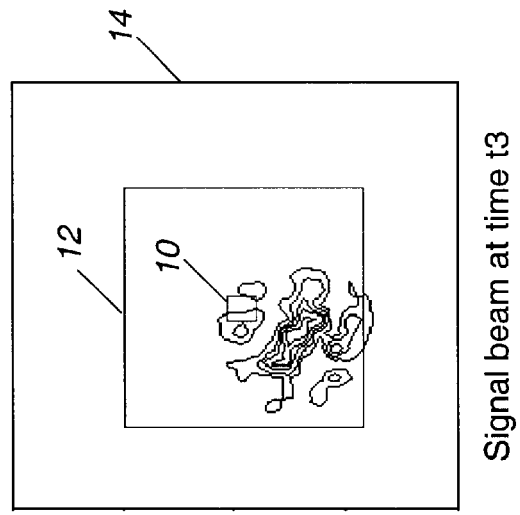
Fig. 1C Signal beam at time t3

OPTICAL COMMUNICATION SYSTEM USING OPTICAL TRANSCRIPTION MATERIAL

CROSS-REFERENCE TO RELATED APPLICATIONS

The present application is related to U.S. patent application Ser. No. 09/587,124, presently U.S. Pat. No. 6,585,532, issued Jul. 1, 2003, filed concurrently herewith, entitled: "Optoelectronic Communication System in Turbulent Medium Having Array of Photodetectors and Time Compensation" by Stephen Palese, assigned to the same assignee as this present invention, and its contents are incorporated herein by reference.

Also related to U.S. patent application Ser. No. 09/587,126, presently U.S. Pat. No. 6,580,540, issued Jun. 17, 2003, filed concurrently herewith, entitled: "Time Compensation Architectures For Controlling Timing Of Optical Signals" by Stephen Palese, assigned to the same assignee as this present invention, and its contents are incorporated herein by reference.

Also related to co-pending U.S. patent application Ser. No. 09/586,014, filed concurrently herewith, entitled: "Electro-Optic Device For Adding/Subtracting Optical Signals" by Stephen Palese, assigned to the same assignee as this present invention, and its contents are incorporated herein by reference.

Also related to U.S. patent application Ser. No, 09/587,125, present U.S. Pat. No. 6,516,103, issued Feb. 4, 2003, filed concurrently herewith, entitled: "Optical Interconnect Capable of Performing Addition/Subtraction" by Stephen Palese, assigned to the same assignee as this present invention, and its contents are incorporated herein by reference.

BACKGROUND OF THE INVENTION

1. Field of the Invention

The present invention relates generally to optical communication systems, and more particularly to an optical communication system that employs an optical transcription material in the receiver and that communicates through a turbulent medium.

2. Description of the Art

The telecommunications industry is rapidly switching to a hybrid platform which utilizes both electronics and photonics to increase the operational bandwidth. Today's communication systems consist of optical fiber networks, fiber amplifiers, optical diode transmitters, and high speed semiconductor receivers. This architecture works well in the confines of optical fibers. There are problems in matching optical fiber network bandwidths, however, when propagating these signals in free space, which is necessary for remote applications.

Free space propagation of the signal through the atmosphere, water or other turbulent media will introduce fluctuating distortions and aberrations. These fluctuations prevent continuous focusing of the signal beam onto the small area high speed detectors typically utilized in optical communication systems.

A realistic example indicates that 0.5 m collection dish with a focal length of 1 m would concentrate the light into a diameter of 200 $\mu$m for a 100 times diffraction limited beam at a wavelength of 1.5 $\mu$m. This area is approximately 300 times larger than the high speed semiconductor photodiode detectors employed in communication systems. Aberrations similar to this could be incurred by atmospheric propagation. One approach is to correct for the distortions with adaptive optics, active tracking systems, or phase conjugation techniques in order to obtain a near diffraction limited signal beam which allows focusing onto the small area high speed detectors. These techniques suffer from slow response times, limited phase front correction or high signal intensities required for efficient conjugation. The other approach is to use a large area detector so that a significant fraction of the distorted signal beam can be collected by the receiver. This method has many advantages but has proven difficult to implement since the detector bandwidth (temporal response) and the detector area are often inherently coupled.

What is needed, therefore, is an optical communication system that is capable of communicating through a turbulent medium and which retains a large intrinsic bandwidth.

SUMMARY OF THE INVENTION

Transmission of an optical signal through a turbulent media, such as the atmosphere, produces a fluctuating spatial intensity pattern due to optical distortions and aberrations. With respect to FIGS. 1A, 1B, and 1C, three views are shown of an optical signal being transmitted through a turbulent media at three instants of time, t1, t2, and t3, respectively. These time varying distortions make it impossible to focus the signal beam onto a single small optical detector illustrated by the numeral 10 typically utilized in optical communication systems. The present invention involves collecting either a large enough subarray of the distorted signal (shown by the numeral 12) or the entire distorted signal (shown by the numeral 14 and encompassing the periphery in FIGS. 1A, 1B, and 1C) with an optical collector. The collected signal is invariant to the fluctuating distortions, thereby eliminating problems in free space propagation of optically transmitted high bandwidth signals.

The present invention involves combining an optical transcription material and an optical interconnect into an optical receiver while maintaining a fast temporal response, and thus a high bandwidth. This receiver directly measures temporal pulses, however, it is applicable to both temporally, phase, or frequency encoded signal sources. A separate transmission beam and probe beam architecture allows each of the optical wavelengths to be optimized for their own individual function. For example, the transmission wavelength could be chosen to increase signal throughput through a turbulent media while the probe beam could allow for dispersion free fiber propagation, or the fastest temporal response.

The optical transcription material (OTM) which will be described subsequently in more detail, utilizes a linear or nonlinear optical pump-probe mechanism to relay the information from the signal beam to the probe beam. The signal beam, also referred to as the pump beam, induces a time dependent index of refraction change, which is interrogated by a probe beam, also referred to as the reading beam. Through this mechanism, information which is encoded onto the signal beam is transcribed into amplitude, polarization rotation or phase modulation of the probe beam. The optical interconnect speed is limited by the intrinsic response time of the OTM as well as propagation delay time mismatches between the signal and the probe beams. These occur through two main sources, the delay time between the pump and the probe beams over the pumped volume (recognizing there is a 1 element delay) and the accumulated delays which occur over the entire optical interconnect.

Briefly, the present invention comprises an optical communication system for communicating through a turbulent medium. It includes an optical transmitter and an optical receiver. The optical receiver receives an optical signal containing information that fluctuates as it passes through a turbulent medium. It comprises a reflector for collecting the optical signal and for focusing it; a probe laser for generating an optical probe beam; an optical device having an OTM responsive to the focused optical signal and the probe beam and operative to change a characteristic of the probe beam, and optoelectronic detector means responsive to said changed characteristic and operative to develop an output electrical signal representative of the information contained in the received optical signal.

In another aspect, the present invention involves a time compensated probe methodology. Operational bandwidths in excess of 10 THz could ultimately be supported by this optical receiver methodology.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

BRIEF DESCRIPTION OF THE DRAWINGS

FIGS. 1A, B and C are drawings that show an optical signal pattern as it is transmitted through a turbulent media, such as the atmosphere, at three different times.

DETAILED DESCRIPTION OF THE PREFERRED EMBODIMENTS

Figure 2:
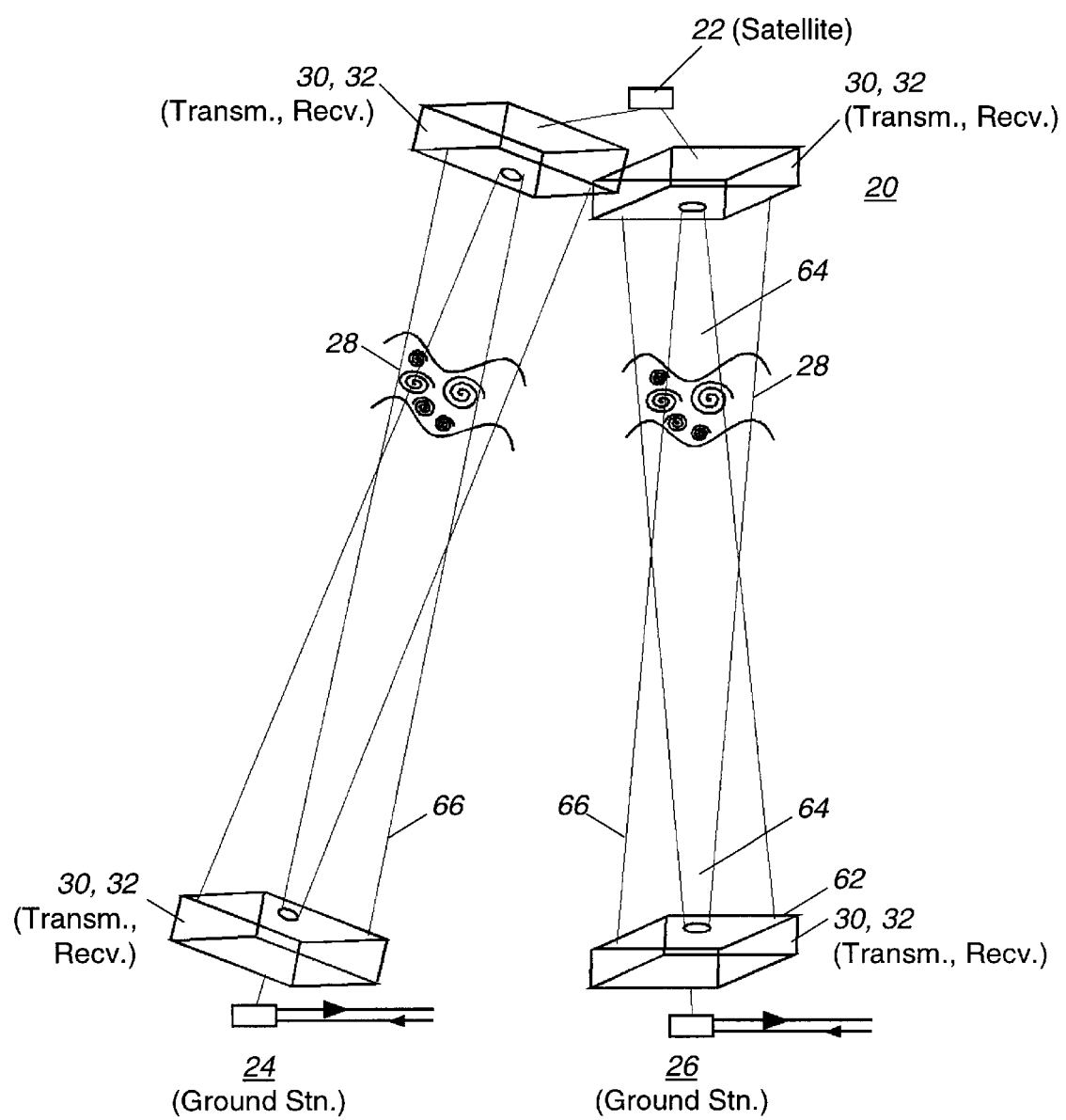
FIG. 2 is a block diagram of the optical communication system in accordance with the present invention.

As illustrated in the block diagram of FIG. 2, the present invention provides an optical communication system, generally designated by the numeral 20. Briefly, the system 20 communicates between a satellite 22 and ground stations 24 and 26 through a turbulent medium 28, e.g., the atmosphere. Alternatively, the communication could be between submarines where the turbulent medium is water or between aircraft or ground stations where the turbulent medium is air as long as there is a line of sight path between the transmitting and receiving stations.

The system 20 includes an optical transmitter 30 and an optical receiver 32 at each ground station 24, 26 and two transmitter/receiver assemblies on board the satellite 22.

As previously described, transmission through the atmosphere 28 produces a fluctuating spatial intensity pattern due to optical distortions and aberrations. These time varying distortions (see FIG. 1) make it impossible to focus the signal beam onto a single small high speed detector, shown by the numeral 10 in FIGS. 1A, B, and C, typically utilized in current optical communication systems. This invention involves collecting either a large enough subarray 12 of the optical signal or the entire distorted signal 14 with a small optical collector. The subarray 12 would collect about 140 times the power that could be collected, for example, by a single detector, as shown by the numeral 10. The collected signal is invariant to the fluctuating distortions, thereby eliminating problem in free space propagation of optically transmitted high bandwidth signals. In particular, the fluctuation is calculated to be reduced from a 60% mean fluctuation (collected by 10) to less than 5% mean fluctuation.

Figure 3:
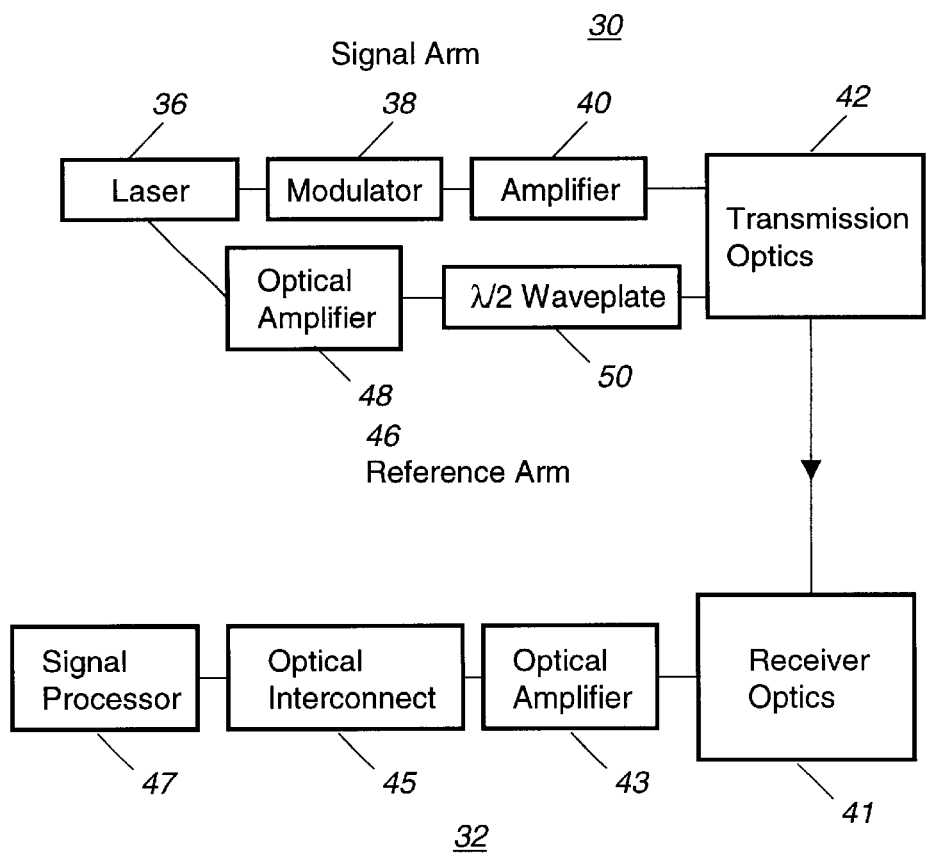
FIG. 3 is a block diagram of the optical transmitter and receiver.
Figure 4:
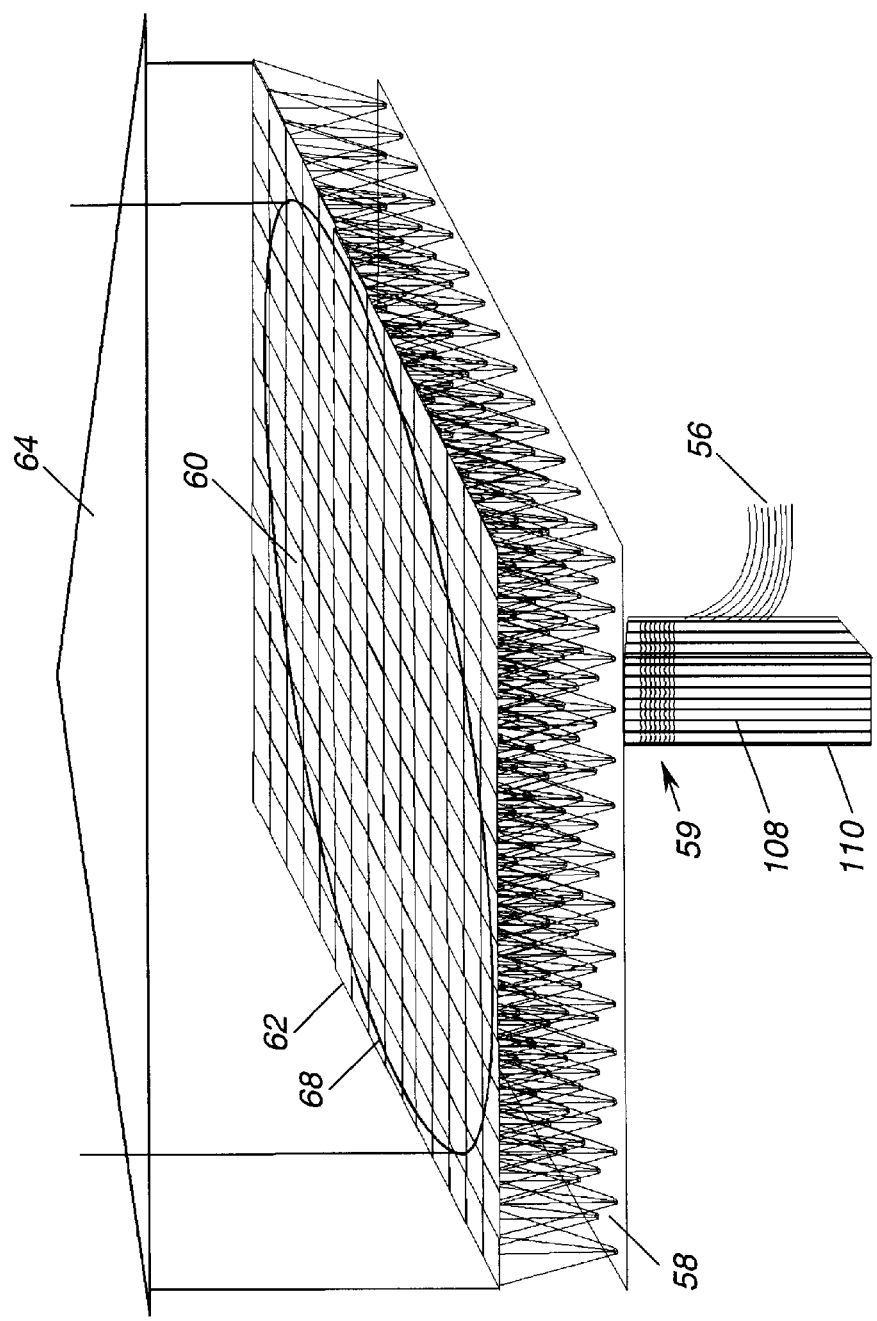
FIG. 4 is a perspective view diagrammatically illustrating transmitter and receiver optics in accordance with the present invention.

Also, with reference to FIGS. 3 and 4, the optical transmitter 30 comprises a laser source 36 for producing an optical signal, a modulator 38 for modulating the optical signal, an amplifier 40 for amplifying the modulated optical signal and an optical reflector 42 for directing and radiating the optical signal to a ground station.

In the preferred embodiment, the laser source 36 is an erbium fiber laser and/or semiconductor laser which would operate in the atmospheric transmission regions in the ultraviolet, visible and infrared portions of the spectrum. An erbium fiber laser operating at 1.5 $\mu$m in the infrared with these characteristics and that produces a 10 watt signal is sold by Lucent Inc. and IRE-Polus. The modulator 38 is a lithium niobate (LiNbO$_3$) electro-optic modulator sold by New Focus Inc. and the amplifier 40 is a fiber optical amplifier. The optical transmitting antenna 42 comprises one lens, or lenslet, in a lens array 62 or a satellite transmitting mirror, such as one made by Kodak Corporation.

As will be described in more detail subsequently with respect to the embodiment shown in FIG. 14, when polarized optical signals are transmitted, the optical transmitter 30 also comprises a reference arm 46 supplying an unmodulated reference signal to the optical transmitting antenna 42. The reference arm 46 comprises an amplifier 48 for amplifying a portion of the optical signal and a one-half wavelength waveplate 50 to flip the polarization of the amplified optical signal. This allows two orthogonally polarized optical signals both at the same wavelength with one containing the information and the other containing the reference, to be transmitted to the receiver.

As shown in FIG. 3, the optical receiver 32 includes receiver optics 41, an optical amplifier 43, an optical interconnect 45 and a signal processor 47.

Referring now to FIG. 4, in the transmitter 30 the amplified modulated optical beam generated by the laser source 36 is propagated through an optical transmitter fiber array 56 attached to openings in an interconnect 58. The individual fibers include Bragg gratings 59 (shown diagrammatically by the numeral) for amplifying (as appropriate), separating, the transmission beam 64 from the received beam 68 by wavelength. Alternatively, Faraday rotators can be employed to separate the transmission and receiving beams based on direction of beam propagation. Each propagated beam diverges in the free space from the opening until it reaches its lenslet 60 or lens in a lenslet array 62. Typically for a single mode fiber the divergence is 10°. The lenslets 60 serve as the transmitting antenna 42 and. collimate the beam and transmit it as an optical signal 64 into free space through the turbulent medium 28 and toward the selected optical receiver 32.

In the preferred embodiment, the lenslet array 62 is fabricated from plastic and comprises a square matrix of 15×15 lenslets having a total side dimension of between 1 and 100 centimeters. Alternatively, the matrix could be hexagonal or octagonal to obtain better fill factors and the number of lenslets could be selected based on the distance between the transmitting and receiving stations. Also the lenslet array 62 and interconnect 58 are separated by less than 1 centimeter of free space.

Figure 5:
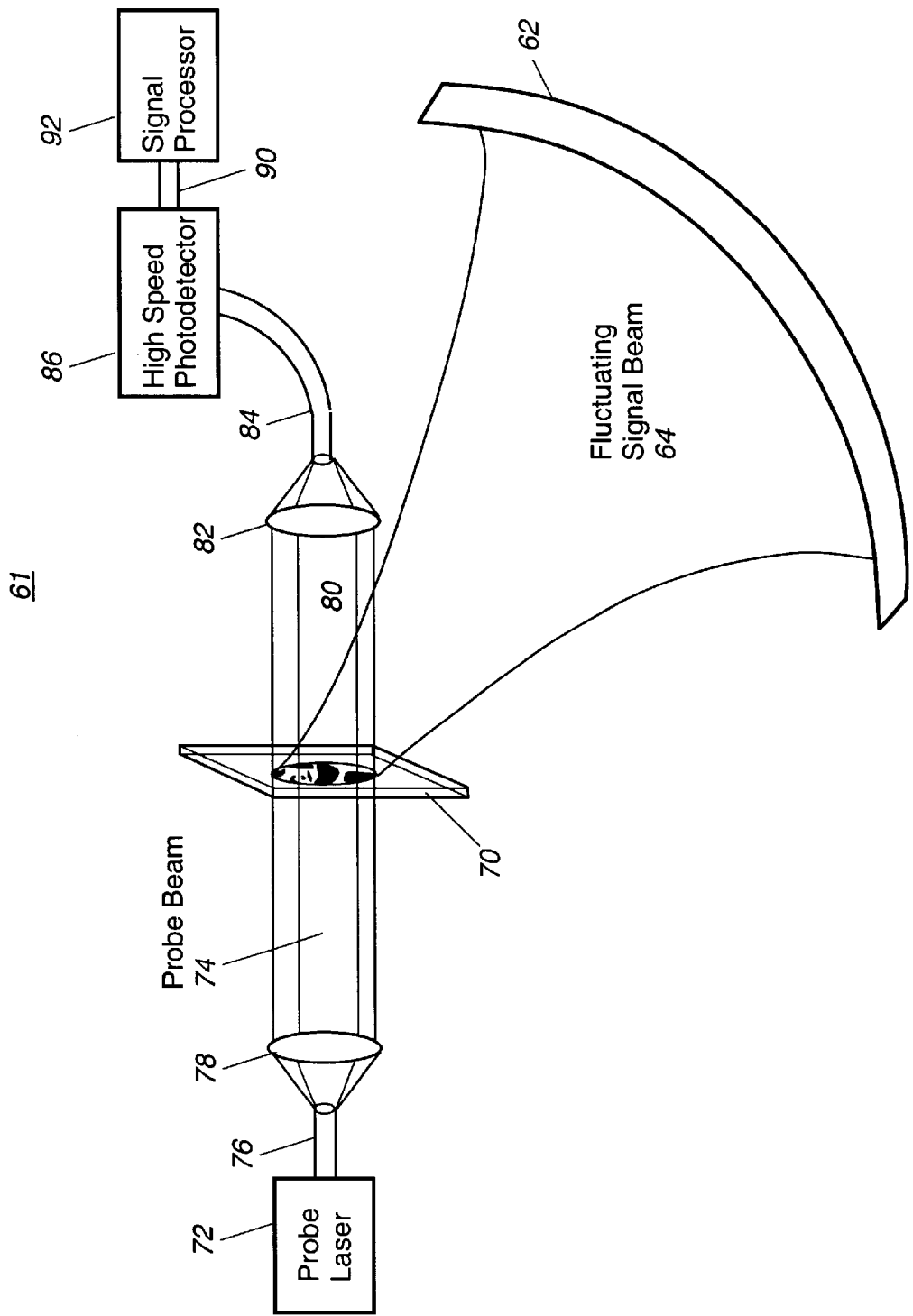
FIG. 5 is a diagram illustrating a free space optical interconnect used in the optical receiver in accordance with the present invention.

With reference now to FIG. 5, an embodiment of a free space optical interconnect, generally illustrated by the numeral 61 incorporated into the optical receiver 32, is illustrated. An optical reflector 62 is positioned to collect the fluctuating and distorted transmitted optical beam 64, also referred to as a signal beam, from the transmitter 30 at a distant station 22. The reflector 62 serves to focus the collected beam on an element 70 comprising an optical transcription material (OTM). In the preferred embodiment for a free space optical interconnect the reflector is a 1 meter spherical dish that collects a signal beam with a power level in the milliwatt range. Alternatively, the collector may have a parabolic curvature.

The OTM element 70 is formed of a photoactive material, such as a polymer film that has a fast response (both rise time and recover time) to the optical signal beam. It interacts with a preselected frequency and has an index of refraction, n, that varies over time when it is probed with the probe beam. Alternatively, it can be a wafer formed of a semiconductor material, such as silicon or gallium arsenide, that is sensitive to infrared radiation, other polymers (undoped or doped with donor or acceptor molecules), molecular crystals, biological and synthetic chromophore systems, or a superconductive material.

A probe laser 72 transmits a probe beam 74 through an optical fiber 76 and a collimating lens 78 to the OTM element 70. The probe beam is diffraction limited or near diffraction limited, may be characterized as having a Gaussian or Bessel waveform, and has a power in the microwatt range. This power is significantly lower than that of the signal beam.

At the OTM the signal beam 64 interacts with the near diffraction limited probe beam 74 through a linear or nonlinear optical process and impresses a phase or amplitude modulation onto the probe beam through index of refraction variations in the OTM. Through this signal-probe mechanism, information which is encoded onto the signal beam is transcribed into amplitude, polarization rotation or phase modulation or the probe beam.

The modulated optical signal, thus produced and identified by the numeral 80, is focused by lens 82 onto an optical fiber 84 and propagated to a high speed photodetector 86. The photodetector 86 converts the modulated optical signal into an electrical signal 90 representative of the information contained in the transmitted and the received optical beams. A signal processor 92 serves to process, manipulate and display the information.

Alternatively, the optical signal can be amplified and sent directly through a ground based optical fiber network (not shown) such that the resultant output signal is optical.

In operation, with the OTM 70 placed in between a free space optical interconnect 60, the distorted signal beam 64 is focused onto the OTM which is interrogated by the probe beam 74. This causes the index of refraction, n, of the OTM to vary over time corresponding to the information contained in the signal beam. Accordingly, the signal beam is modulated. This modulated beam 80 is propagated to the photodetector 86 which converts it to an electrical signal 90 containing the transmitted information. A signal processor 92 processes the electrical signal.

It should be recognized that the probe and signal beam overlap would be variable, trading off increased modulation depth with smaller probe sizes and increased tolerance to signal fluctuations with larger probe beam areas.

Figure 6:
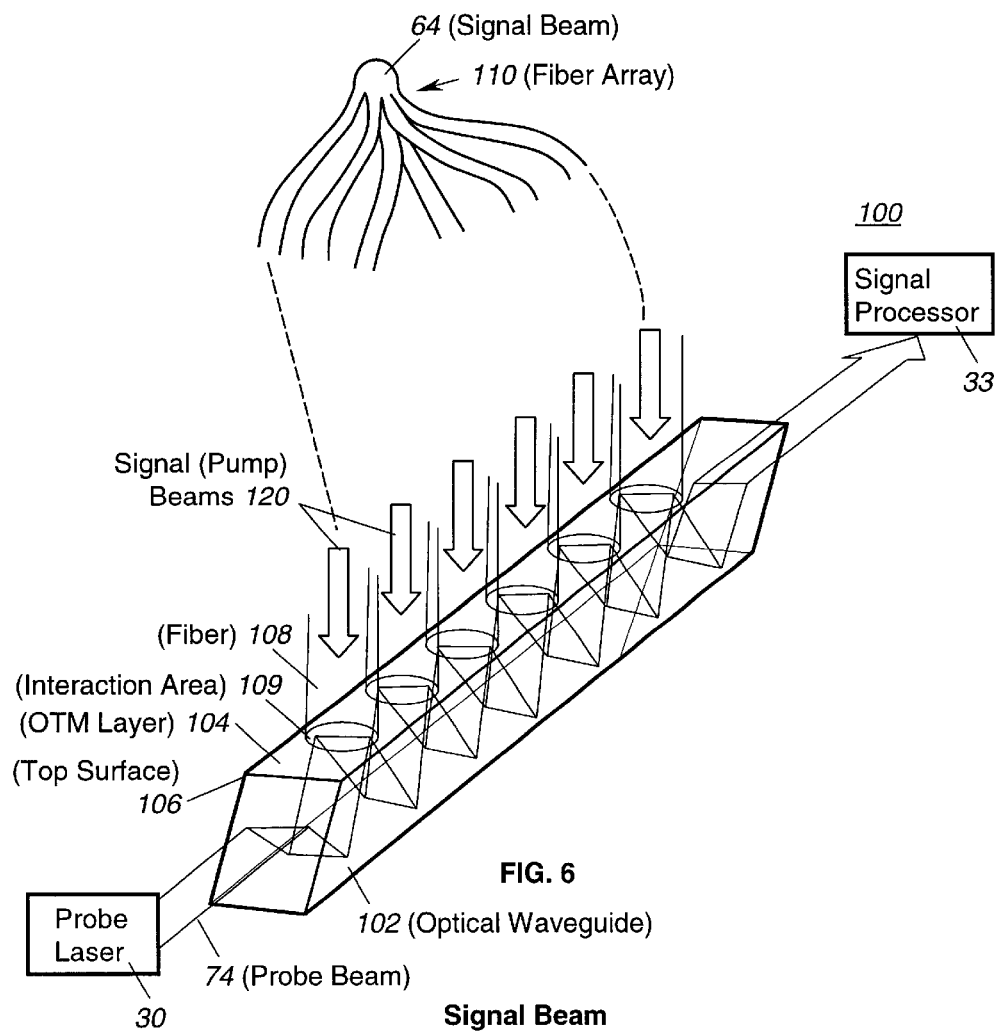
FIG. 6 is a diagram illustrating a waveguide optical interconnect used in the optical receiver in accordance with the present invention.
Figure 7:
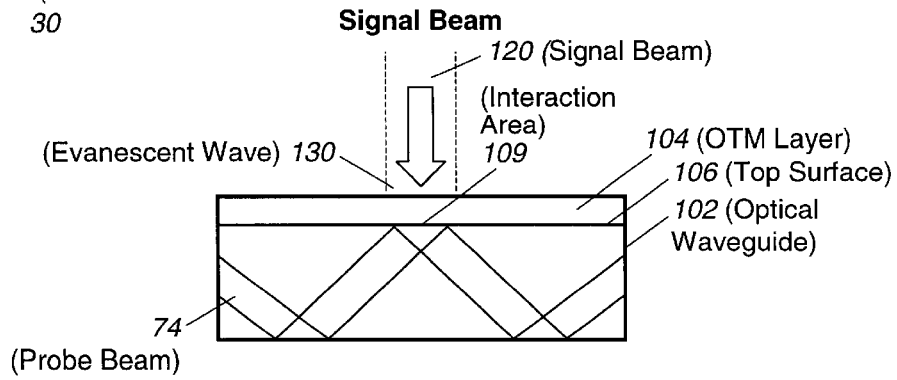
FIG. 7 is a side view diagrammatically illustrating the operation of the waveguide optical interconnect shown in FIG. 6.

Another embodiment of the optical interconnect of the present invention is illustrated in FIGS. 6 and 7. As shown, this is represented by a waveguide optical interconnect 100 that is characterized by generally total internal reflection (TIR). More particularly, an optical waveguide 102, also referred to as a TIR device, includes a layer 104 of an optical transcription material (OTM) over a surface 106. The thickness of the waveguide is selected such that certain modes of a probe beam hit the interaction areas 109 of the OTM when the probe beam 74 is propagated through the waveguide. A plurality of optical fibers 108 arranged in an array 110 propagate signal beams 120 from the optical receiver (as shown in FIG. 4) to the interaction areas 109. The signal beams 120 transmitted through the fiber array 110 to the interaction areas 109 of the optical transcription material (OTM) 104 and serve to pump the OTM. The evanescent wave 130 of the probe beam 74 penetrates into the OTM (see FIG. 7) at the interaction areas 109 and introduces either an amplitude or phase change on the probe in response to the index of refraction $\Delta n$, change, induced by the signal beam.

As will be described regarding FIG. 8, a time compensated architecture for the fiber array will synchronize the signal and probe beams at each point of the OTM minimizing accumulated propagation delay errors.

This optical interconnect is based on amplitude or phase variations which can be induced at TIR interaction surfaces 109 (see FIG. 7). The exponentially damped evanescent wave 130 exists at a TIR interface and therefore can monitor index of refraction changes which occur on the other side of the boundary. This mechanism forms the basis for many chemical and biological fiber sensors. In these representations, the OTM 104 must be physically close to the TIR surface 109 such that the probe evanescent field penetrates into the interaction region 109 which is optically excited by the signal beam 120. This TIR surface can reside in a bulk optic or an optical waveguide.

The critical angle, $\theta_c$, for the TIR is $$\theta_c = \sin^{-1}\left(\frac{n_1}{n_2}\right)$$

where $n_1$ and $n_2$ are the index of refraction of the two mediums comprising the waveguide 102 and the OTM 104, respectively.

Referring also to FIG. 6, the signal beam 64 will initially be collected with a receiver array (see FIG. 4). This receiver may be a lenslet array, a diffractive optic, or any combination of these elements and serves to focus the signal 64 onto a fiber optic array 110. This array 110 is constructed such that each of the individual fibers 108 transmit the signal onto one site of the optical interconnect device which is coated with the OTM 104. The index of refraction variations of the optical transcription are material induced by the signal (pump) beam 120, and are translated into either amplitude or phase modulation of the probe. Polarization rotation of the probe can be accomplished by differential phase modulation along orthogonal OTM directions. If the index change at the probe wavelength is large enough that the critical angle requirement is no longer met by the probe, then a portion of the beam will be transmitted through he boundary layer and amplitude modulation will result. Phase modulation occurs if the index variation on the OTM is such that the requirement for critical angle at the TIR interface is still satisfied by the probe beam. This change $\Delta\phi$ can be expressed as $$\Delta\phi = \frac{1}{n}\frac{\partial\phi}{\partial n}\Delta n_2$$

where $n_1$ is the index of the TIR optic or waveguide and $n_2$ is the index of the optical transcription material. For the two cases where the electric field is either perpendicular or parallel to the plane of incidence $$\frac{\partial\phi_\perp}{\partial n} = -\sin\phi_\perp\left(\frac{n}{\sin^2\theta - n^2}\right)$$

$$\frac{\partial\phi_\parallel}{\partial n} = -\sin\phi_\parallel\left(\frac{n}{\sin^2\theta - n^2} + \frac{2}{n}\right)$$

For a typical TIR optical interconnect $\theta=55°$, $n_1=1.8$ and $n_2=1.3$ the phase shifts are approximately $\partial\phi_\perp \approx 4.4\Delta n_2$ $\partial\phi_\parallel \approx 7.6\Delta n_2$ for parallel and perpendicular electric fields respectively. The probe cumulative phase change through the TIR optic would add in a root mean squared manner (100 bounces will induce 10 times the phase shift) unless the signal and probe beams are optically phase locked.

The TIR based interconnect approach would employ a time compensated reading methodology which provides a means for correcting optical delays which occur in a serial reading beam architecture due to the time required for the probe beam to propagate. The probe optical beam has a propagation time of nd/c, where n is the material index of refraction, d is the distance and c is the speed of light. For a large array this propagation delay can seriously degrade the receiver temporal response. For example, a thousand element fiber array of 100 μm diameter fibers would take 600 ps to read. With a time compensated architecture the arrival of the signal beam at the transcription site is made to be synchronous (either on a row by row or element by element basis) with the arrival of the reading (probe) beam so that propagation delays do not accumulate. This is accomplished by inserting an equivalent (compensating) optical delay in a prescribed manner into the signal beam.

Figure 8:
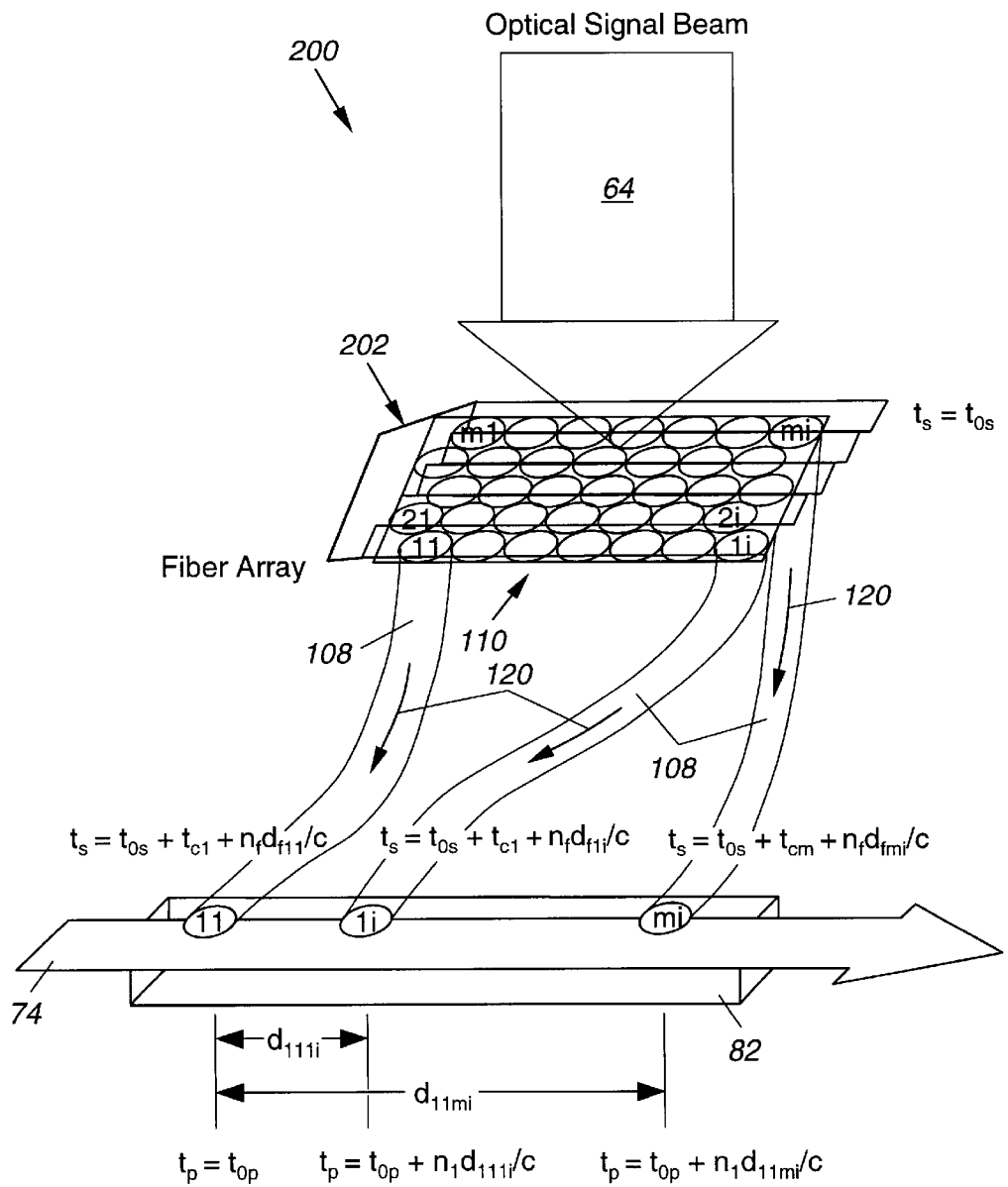
FIG. 8 is a diagram illustrating a configuration for providing time compensation for use with a serial reading technique in accordance with the present invention.

FIG. 8 shows a one dimensional time compensation system for a serial reading device, generally illustrated by the numeral 200. Many of the parts of the system 200 are identical in construction to like parts in the apparatus illustrated in FIGS. 5 and 6 described above, and accordingly, there have been applied to each part of the system in FIG. 8 a reference numeral corresponding to the reference numeral that was applied to the like part of the apparatus described above and shown in FIGS. 5 and 6. The collected optical signal 64 arrives at a time compensation element (TCE) 202. The TCE 202 comprises an optical wedge of the kind that is commercially available from several optical device manufacturers. The optical wedge is configured as an m x i matrix. As the TCE 202 lies in front of the optical fiber array 110. The optical signal at time $t_s=t_{os}$, transmits through the TCE 202 and propagates to the optoelectronic detector (not shown) at the end of the fiber at time $$t_s = t_{os} + t_{cm} + n_f d_{fmi}/c$$

where $t_{cm}$ is the time delay in row m of the TCE 202, $n_f$ is the index of refraction of the optical fiber 108, $d_{fmi}$ is the length of the optical fiber in row m and column i, and c is the speed of light.

If the fibers 108 are the same length and no time compensation element is included, then the probe beam 74 and the signal beam 120 accumulate a temporal error equal to $n_1 d_{11mi}/c$ which degrades the array's temporal resolution. The time compensation optical element 202 with $t_{cm}=n_1 d_{m1mi}$ serves to synchronize the probe beam 74 and the optical signal beam 120 at a point in each row of the array so that the temporal degradation is reduced.

Thus, each row is compensated. More particularly, the center element in each row is synchronized with the probe beam 74. Note the other elements in each row are not synchronized. Thus, this technique has some temporal resolution error associated with it, which would be analogous to time jitter. For a square fiber bundle 110, the one dimensional time compensation scheme allows the number of fibers to be squared (i.e., 10 fibers becomes 100 fibers) with the same temporal resolution (frequency bandwidth).

Figure 9:
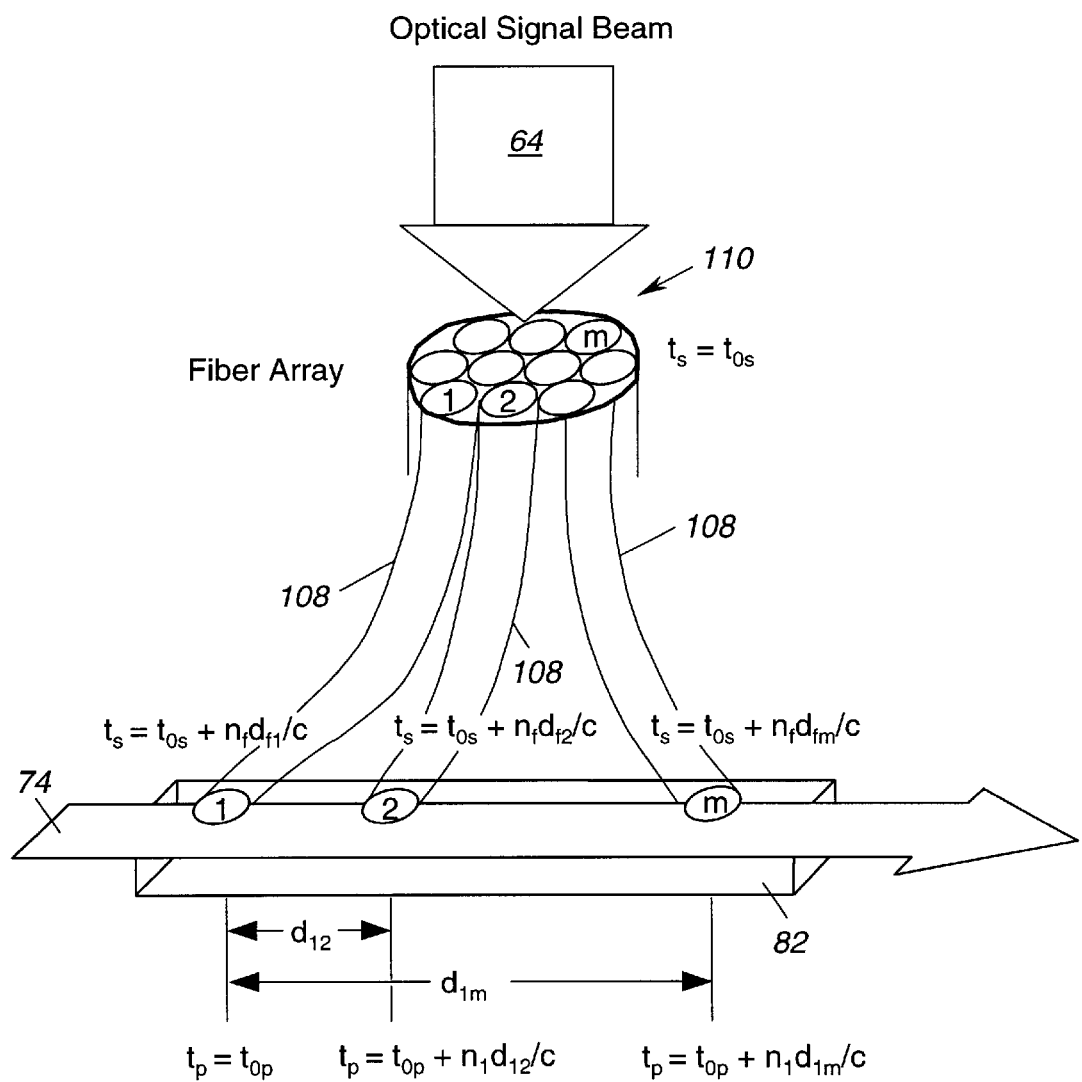
FIG. 9 is a diagram of another embodiment for providing two dimensional time compensation in accordance with the present invention.

FIG. 9 shows an element by element time compensation architecture. The optical signal beam 64 arrives at the fiber array 110 at time $t_s=t_{os}$ and propagates to the end of the fiber at time $$t_s = t_{os} + n_f d_{fm}/c$$

where $n_f$ is the index of refraction of the fiber 108, $d_{fm}$ is the length of fiber m, and c is the speed of light.

If the fibers 108 are the same length and no time compensation element is included, then the probe beam 74 and signal beam 64 accumulate a temporal error equal to $n_1 d_{1m}/c$ which degrades the array's temporal resolution. As, however, in accordance with this invention the fiber lengths are tailored such that $n_f(d_{fm}-d_{f1})=n_1 d_{1m}$ the probe and signal beam are synchronized at each point in the array. Thus, this embodiment does not degrade the optical reading of the probe beam.

Figure 10:
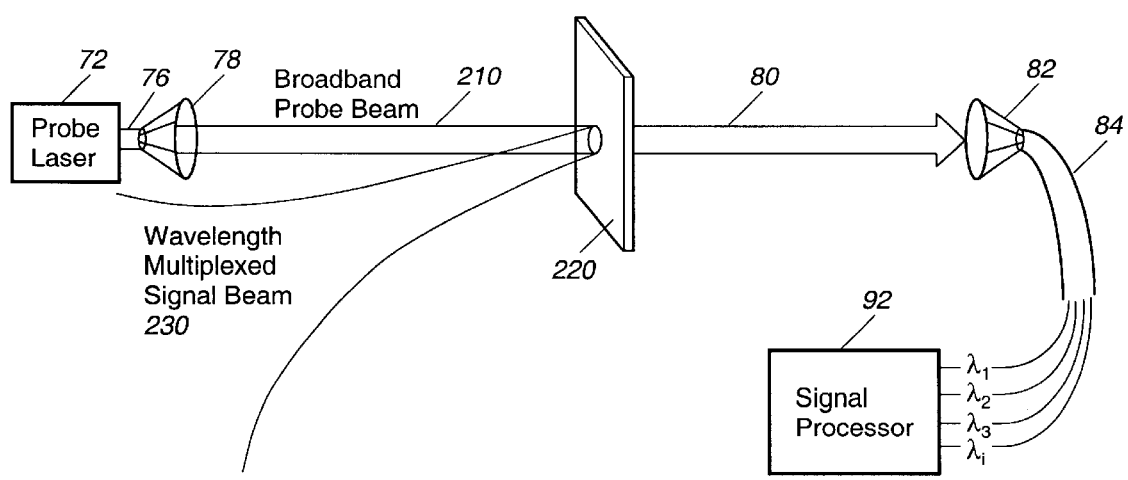
FIG. 10 is another embodiment using the optical transcription material in the optoelectronic receiver for spectral multiplexing in accordance with the present invention.
Figure 11:
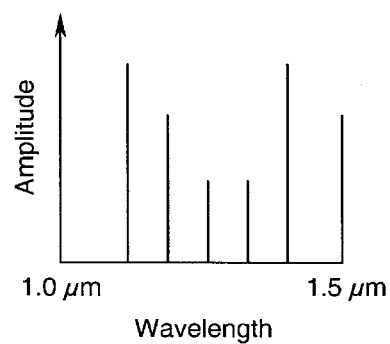
FIG. 11 illustrates the wavelength multiplexed signal beam used in FIG. 8.
Figure 13:
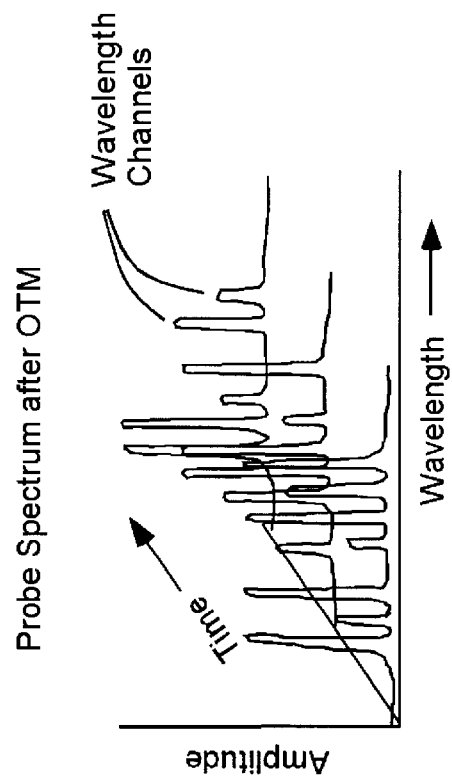
FIG. 13 illustrates the probe spectrum developed by the optical transcription material used in FIG. 8.
Figure 12:
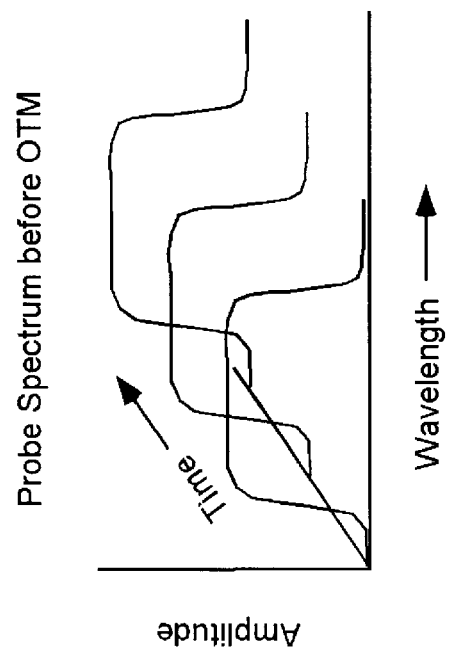
FIG. 12 illustrates the probe spectrum applied to the optical transcription material used in FIG. 8.

There are a number of techniques which can be utilized to increase the operational bandwidth even further. As illustrated in FIG. 10, a dynamic spectral multiplexing configuration is shown. Wavelength multiplexing akin to that used in fiber optic systems can also be applied to increase this receiver's operational bandwidth. A spectrally selective optical element 240 (Bulk or fiber Bragg grating, acousto-optic or electro-optic deflector, prism, interference filter) is utilized to route four different wavelengths, $\lambda_1$, $\lambda_2$, $\lambda_3$, and $\lambda_4$ to different optical interconnects 250. The receiver bandwidth therefore increases linearly with the number of signal wavelengths. This technique, however, does not take full advantage of the optical transcription material. Instead, dynamic spectral multiplexing/demultiplexing in which a broad bandwidth probe beam 210 (i.e., femtosecond or picosecond pulse, frequency swept (chirped) pulse, broadband continuous wave) monitors the transient response of an OTM 220 across a number of wavelength channels is used to decode a wavelength multiplexed signal beam 230. FIG. 11 illustrates the graph of a wavelength multiplexed probe beam 210, with the abscissa being in wavelengths and the ordinate showing the amplitude of the several probes. The abcissa is shown for probes having a wavelength from 1.0 $\mu$m to 1.5 $\mu$m. FIG. 12 illustrates an alternative probe showing a three-dimensional configuration of the broadband probe beam 210 showing amplitude versus wavelength over time. This technique is based on the phenomena of transient spectral hole burning, where each component of the multi-wavelength signal beam induces an index of refraction change at a specific probe wavelength. Persistent spectral hole burning, which exists at low temperatures, has been utilized for high density optical storage media. Here, the intrinsic relaxation time of the media from an inhomogeneous to a homogeneous state is utilized to accomplish real time signal processing. Physically, the dynamic spectrally multiplexed OTM 220 could be one photoactive medium, or alternatively, a composite photoactive device with a series of carefully controlled layers with each layer's optical properties tuned by chemical structure. Dynamic spectral multiplexing would reduce the complexity of the system by requiring only one optical interconnect with the probe decomposed into its constituent wavelength channels afterwards by a series of fiber Bragg gratings 240 or other spectrally selective components shows the beam spectrum 80 after passage through the OTM 220 with the information displayed for 3 wavelength channels.

In particular, a spectrally broadband probe beam 210 interrogates the wavelength channels of the optical transcription material 220. These wavelength channels are formed through the dynamic spectral hole burning mechanism. The information encoded on the broadband probe is decomposed into its constituent wavelengths with a spectrally selective element 240 (or elements), such as a series of fiber Bragg gratings, and sent to signal interconnect 250 and then to a signal processor 92. Alternatively, the optical information may be directly distributed through an optical fiber network.

There are also a number of methods to increase the signal to noise ratio for the optical receivers. The signal beam can be optically amplified in a solid state gain media or the fibers themselves could serve as the optical amplifiers. With reference to FIGS. 14 and 15, an optical architecture 300 for subtraction and with polarization multiplexing is illustrated. As shown and also referring to FIG. 3, a polarized optical source beam 64 is generated by the optical transmitter 30 via the reference arm 46 at the satellite 22. Hence, the optical source beam 64 produces two orthogonally polarized optical signals, both at the same wavelength with one signal beam 302 containing the information and the other reference beam 304 containing the reference. The receiver 32 includes a half wavelength waveplate to adjust the orthogonality of the polarization. These optical interconnect constructs are also amenable to differential signal transmission methods utilizing a reference beam 304 and a polarization multiplexed signal beam 304 (see FIG. 14 and 15). The reference could be separated from the signal with a $\lambda/2$ waveplate (either a static or dynamic element). When adjusted properly, no mixing of the polarized signal beams occurs. This aligns the receiver polarization to the transmitter and polarizer and is sent to an OTM detector 306. A polarizer serves to split the received optical source beam into its signal component 305 and its reference component 307. The signal beam component is supplied to the individual fibers 84 and in turn to the subtraction device 320. The reference beam component 307 is supplied to a reference optical fiber 332 and in turn to a reference port of the subtraction device 320. This configuration allows receiving a signal and a reference beam simultaneously. Both beams contain the same aberrations and distortions since they propagate along the same optical path. This configuration serves to remove unmodulated background and enables modulation schemes which can increase the receiver bandwidth. The subtraction device 320 serves to reconstruct the modulated signal. The subtraction device 320 is configured to provide optical or electrical subtraction.

Figure 14:
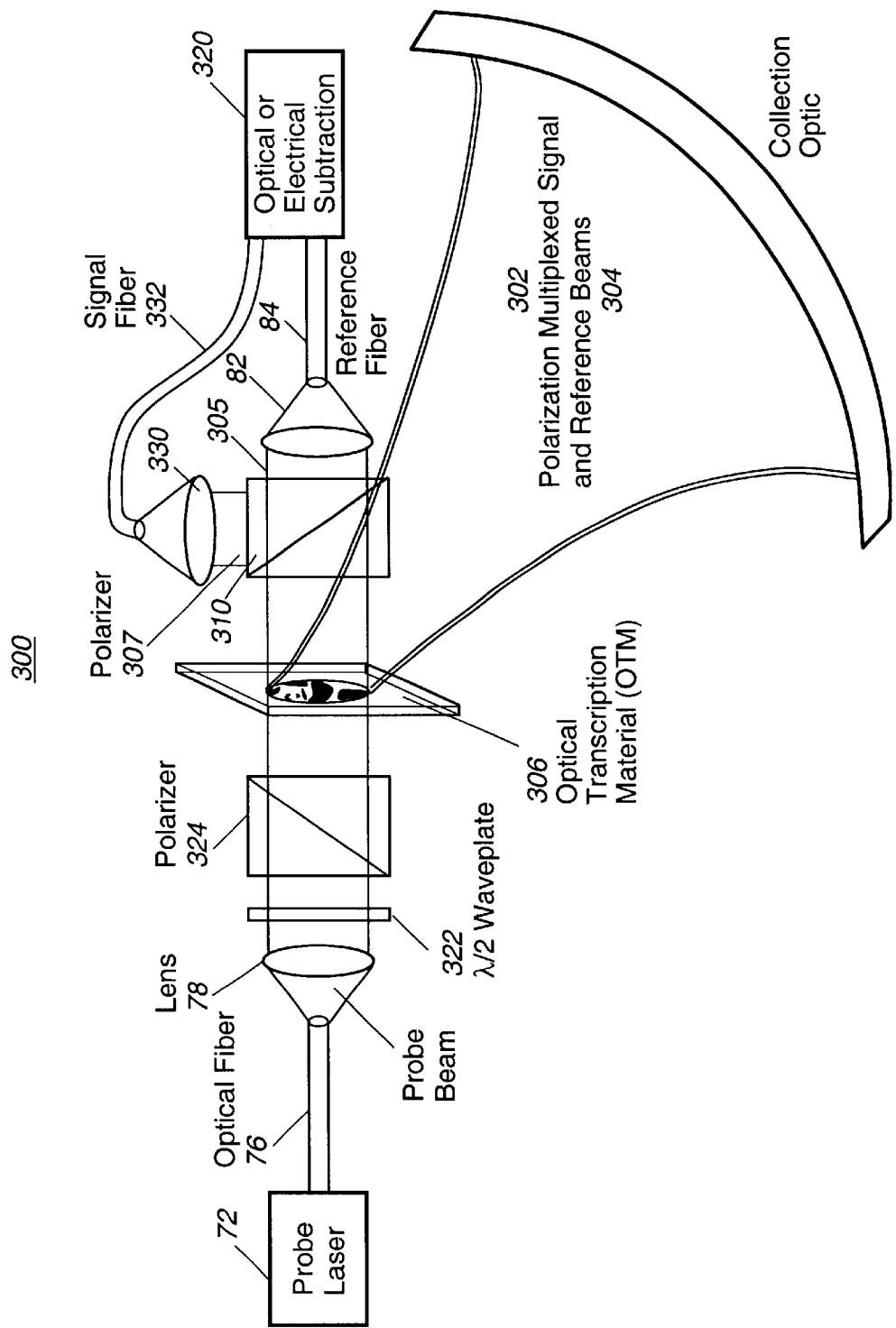
FIG. 14 is a diagram illustrating an optical subtraction technique for use in an optoelectronic receiver in accordance with the present invention.
Figure 15:
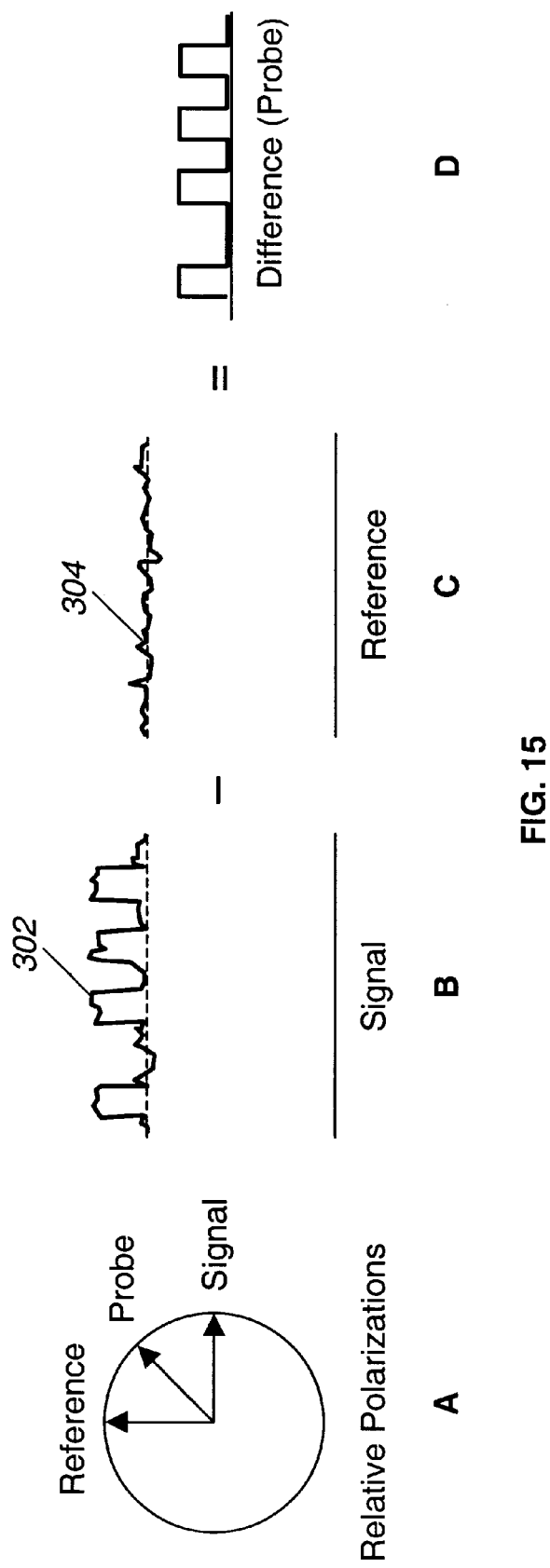
FIG. 15 shows the waveforms of the signal and reference beams associated with the optical subtraction technique illustrated in FIG. 14.

An optical subtraction method 300 is illustrated in FIG. 14. This method utilizes polarization sensitive techniques including transient grating, dichroism, anisotropy, parametric generation, and/or the optical Kerr effect. These techniques could also be employed to optically eliminate the unmodulated background which remains in quadrature phase modulation schemes. The polarization multiplexed signal beam 302 and the reference beam 304 are sent into the OTM 306 with a probe configuration which monitors differences in the orthogonal signal and reference beams. The probe configuration comprises a probe laser 72 that delivers a probe beam 74 via an optical fiber 76, a collimating lens 78, and a $\lambda/2$ waveplate 322 and a polarizer 324 to provide a probe beam that is oriented at 45° to the reference and signal beams. These optical subtraction techniques offer advantages in terms of operational bandwidth and signal to noise levels from electronic subtraction methods.

In operation, a reference beam 304 and signal beam 302 which have orthogonal polarizations (see FIG. 15) can be optically subtracted by using polarization based optical techniques. The signal beams 302, as shown in FIG. 15B, and the reference beam 304, as shown in FIG. 15C, have the same fluctuating distortions since they propagate along the same optical path. Illustrated in FIG. 14 is one representative example of optical dephasing which includes the optical Kerr effect and also dichroism where the probe polarization is oriented 45 degrees from both the signal and the reference beams. This configuration monitors differences in the two beams by providing a signal path via focusing lens 330 and a signal fiber 332 and a reference path through focusing lens 82 and a reference fiber 84 to the subtraction device 320. This is shown in FIG. 15D and eliminates the unmodulated background which remains in quadrature phase modulated transmission schemes. This optical subtraction method has advantages over electrical techniques in terms of operations bandwidth and signal to noise levels.

Alternatively, the polarizer and reference path can be eliminated when an anisotropic OTM is oriented to perform the subtraction function.

Optical measurements based on anisotropic OTM signal induced properties, such as optical dephasing including optical Kerr effect and dichroism, could also be utilized to increase operational bandwidths even further for linear optical techniques. In these instances, the relaxation time of the OTM would not be limited by excited state lifetimes (typically 1–100 ps). Instead optical dephasing rates which are one to two orders of magnitude faster (10–100 fs) produce ultrafast OTM response times (>10 THz bandwidth).

The receiver bandwidth would therefore increase linearly with the number of signal wavelengths. Fiber based wavelength multiplexing for example has expanded bandwidths by factors of >100.

Amplitude modulation of the reference beam could be utilized along with the temporal or phase modulation of the signal beam to encode information. For example, with a signal to noise level of >64:1, 6 bits of information could be encoded instead of 1 bit per pulse allowing an increase in the total bandwidth by a factor of 6.

Obviously, many modifications and variations of the present invention are possible in light of the above teachings. Thus, it is to be understood that, within the scope of the appended claims, the invention may be practices otherwise than as specifically described above.

What is claimed and desired to be secured by Letters Patent of the United States is:

1. An optical receiver for receiving an optical signal containing information that fluctuates as it passes through a turbulent medium comprising:

means for collecting the optical signal and for focusing it;

means for generating an optical probe beam;

an optical device responsive to the focused optical signal and the probe beam and operative to change a characteristic of the probe beam; and a detector means responsive to said changed characteristic and operative to develop an output signal representative of the information contained in the received optical signal;

wherein said optical device comprises a waveguide optical interconnect having an optical transcription material (OTM) over a surface that defines a plurality of interaction areas, said probe beam reflecting through said waveguide optical interconnect at said interaction areas, said optical signal serving to change the index of refraction of said OTM at said interaction areas.

2. The optical communication system as recited in claim 1 and further comprising processing means for processing said output signal.

3. The optical receiver as recited in claim 1 and further comprising processing means for processing said output signal.

4. The optical receiver as recited in claim 1 wherein the information is amplitude modulated.

5. The optical receiver as recited in claim 1 wherein the information is phase modulated.

6. The optical receiver as recited in claim 1 wherein said received optical signal is polarized.

7. The optical receiver as recited in claim 1 wherein said means for collecting comprises a spherical disk.

8. The optical receiver as recited in claim 1 wherein said OTM is characterized by an index of refraction that varies over time, said varying index of refraction serving to modulate the probe beam with the information contained in the received optical signal.

9. The optical receiver as recited in claim 8 wherein said OTM comprises a polymer.

10. The optical receiver as recited in claim 8 wherein said OTM comprises a semiconductor material.

11. The optical receiver as recited in claim 1 and further comprising a matrix of optical fibers interconnecting the collected optical signal and said interaction areas.

12. The optical receiver as recited in claim 11 and further comprising time compensation means for synchronizing the matrix of optical signals propagated by said matrix of optical fibers.

13. The optical receiver as recited in claim 12 wherein said matrix comprises m columns and i rows, and wherein the central optical fiber in each column is synchronized.

14. The optical receiver as recited in claim 12 wherein each optical fiber comprises a length having a dimension for synchronizing said matrix of optical signals.

* * * * *